(12) United States Patent
Newell et al.

(10) Patent No.: US 6,911,980 B1
(45) Date of Patent: Jun. 28, 2005

(54) MANIPULATION OF CURVES AND SURFACES

(75) Inventors: Martin E. Newell, Palo Alto, CA (US); John Peterson, Menlo Park, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 09/458,917

(22) Filed: Dec. 10, 1999

(51) Int. Cl.[7] .............................................. G06T 11/20
(52) U.S. Cl. ....................... 345/441; 345/442; 345/652; 345/647; 345/469; 345/769; 382/203; 382/242
(58) Field of Search ............................. 345/440, 440.1, 345/441, 442, 443, 467, 465, 469, 469.1, 470, 471, 472.3, 619, 620, 647, 650, 652, 788, 799, 856, 769, 157, 474, 581, 858, 861; 382/242, 243, 203, 301, 175

(56) References Cited

U.S. PATENT DOCUMENTS

| | | | | |
|---|---|---|---|---|
| 5,481,659 A | * | 1/1996 | Nosaka et al. | 395/123 |
| 5,539,868 A | * | 7/1996 | Hosoya et al. | 345/468 |
| 5,598,182 A | * | 1/1997 | Berend et al. | 345/619 |
| 5,731,820 A | * | 3/1998 | Broekhuijsen | 345/442 |
| 5,754,183 A | * | 5/1998 | Berend et al. | 345/581 |
| 5,852,447 A | * | 12/1998 | Hosoya et al. | 345/468 |
| 5,857,067 A | * | 1/1999 | Hassett et al. | 345/150 |
| 5,920,324 A | * | 7/1999 | Hasegawa et al. | 345/467 |
| 5,929,867 A | * | 7/1999 | Herbstman et al. | 345/474 |
| 6,157,390 A | * | 12/2000 | Cheng | 345/467 |
| 6,232,987 B1 | * | 5/2001 | Choi et al. | 345/467 |
| 6,271,864 B1 | | 8/2001 | Graham | |
| 6,300,955 B1 | * | 10/2001 | Zamir | 345/626 |
| 6,459,439 B1 | * | 10/2002 | Ahlquist, Jr. et al. | 345/672 |
| 6,501,475 B1 | * | 12/2002 | Cheng | 345/467 |
| 6,522,328 B1 | | 2/2003 | Asente | |
| 6,628,295 B2 | | 9/2003 | Wilensky | |

OTHER PUBLICATIONS

Graphics Interface '89, "A Technique for the Direct Manipulation of Slines Curves", Bartels et al., pp. 33–39.*
Peterson, John W., "IV.6 Tessellation of NURB Surfaces," Copyright 1994 by Academic Press, Inc.
Peterson, John, "Letters to the Editor Degree Reduction of Bezier curves," Computer Aided Design, vol. 23, #6 Jul./Aug. 1991.
DeRose, Tony D. et al, "Functional Composition Algorithms via Blossoming," May 28, 1992.
Heckbert, Paul S., "Fundamentals of Texture Mapping and Image Warping," Master's Thesis, Dept. of Electrical Engineering and Computer Science University of California, Berkeley, CA, Jun. 17, 1989.
Watkins, M.A. and Worsey, A.J., "Degree reduction of Bezier curves," CAD v20, #7, Sep. 1988.
Venkat Krishnamurthy, Marc Levoy, "Fitting smooth surfaces to dense polygon meshes", Proceedings of the 23rd annual conference of Computer graphics and interactive techniques, p. 313–324, Aug. 1996.

(Continued)

Primary Examiner—Matthew Luu
Assistant Examiner—Wesner Sajous
(74) Attorney, Agent, or Firm—Fish & Richardson P.C.

(57) ABSTRACT

In a shape manipulation method, relocation information is received indicative of an intended change in position of a target location on a Bezier shape, the contour of the Bezier shape being governed by control points. In response to the relocation information, new positions are determined for canonical locations on the shape based on predefined intended behaviors of the canonical locations.

24 Claims, 11 Drawing Sheets

OTHER PUBLICATIONS

Frederick W.B. Li, Rynson, W.H. Lau, "Real–time rendering of deformable parametric free–form surfaces", Proceedings of the ACM symposium on Virtual reality software and technology, p. 131–138, Dec. 20–22, 1999, London, United Kingdom.

Tony DeRose, Michael Kass, Tien Truong, "Subdivision surfaces in character animation", Proceedings of the 25$^{th}$ annual conference on Computer graphics and interactive techniques, p. 85–94, Jul. 1998.

Bartels et al., "A Technique For The Direct Manipulation of Spline Surves", Graphics Interface '89, pp. 33–39.

Fowler, "Geometric Manipulation of Tensor Product Surfaces", Royal Melbourne Institute of Technology, Advanced Computer Graphics Centre, pp. 101–108.

* cited by examiner

MANIPULATION OF CURVES AND SURFACES

BACKGROUND

This invention relates to manipulation of curves and surfaces.

Figure 1:
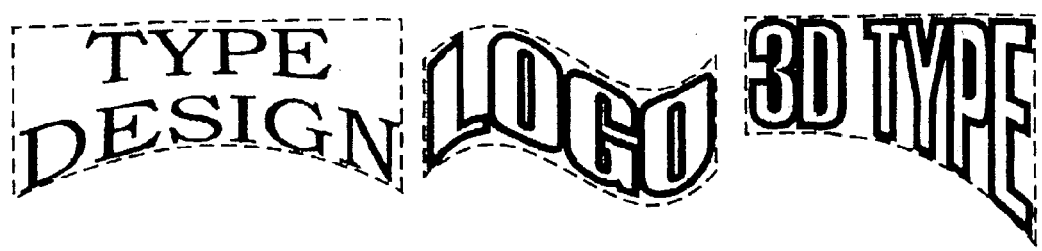

When working with artwork in an illustration program like Adobe Illustrator, it is useful to be able to bend or distort curves and surfaces of the artwork in an arbitrary, free-form way. As shown in FIG. 1, controlled distortion may be used for creative manipulation of type for headings or logos, stretching artwork to fit a particular shape, or giving artwork the appearance of being in a three-dimensional scene without actually defining it in three dimensions.

Bezier curves are widely used to describe curved outlines of objects, such as font glyphs, automobile bodies, and graphic arts curves. A Bezier curve is a mathematical formulation of a curve defined by a sequence of control points. A cubic (3 degree) Bezier curve has four control points. The curve goes through (i.e., the end points of the curve lie on) the first and last control points. A Bezier spline is a sequence of Bezier curves joined end-to-end. A Bezier surface is a mathematical formulation of a surface defined by a rectangular array of control points. A cubic Bezier surface has sixteen control points that all may require manipulation to achieve a desired result.

Figure 2:
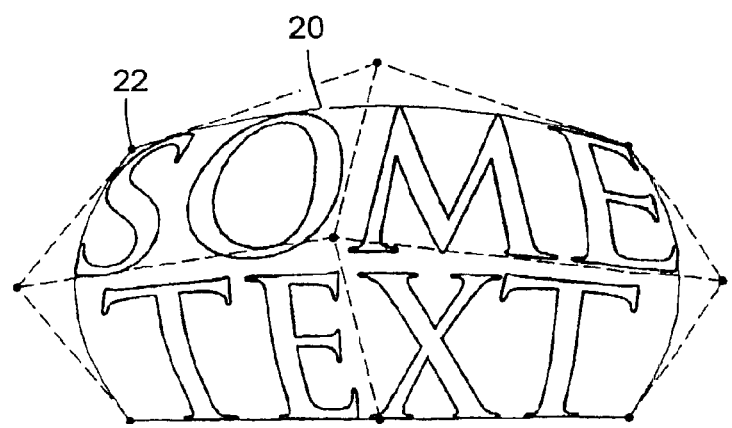

A known method for manipulating the shapes of curves uses a two-dimensional tensor product surface to specify the distortion. As shown in FIG. 2, a uniform, rectangular surface 20 is created around the selected artwork. By distorting the shape of the surface, the user may distort the artwork in a corresponding way. The distortion surface is defined by a rectangular grid of control points 22. Moving the control points of the surface changes the shape in much the same way that moving the control points of a Bezier curve changes the shape of the curve.

Bartels and Beatty in "A Technique for the Direct Manipulation of Spline Curves" (Graphics Interface '89) proposed a scheme in which dragging a point produces limited freedom movement of control points with no freedom on how the curve distorts.

SUMMARY

In general, in one aspect of the invention, in response to relocation information indicative of an intended change in position of a target location on a Bezier shape (e.g., a curve or a surface), new positions are determined for canonical locations on the shape based on predefined intended behaviors of the canonical locations.

Implementations of the invention may include one or more of the following features. The shape may include a d-degree Bezier curve governed by d+1 control points and having d+1 canonical locations. The control points may be adjusted so that the Bezier shape contains the canonical locations in their new positions. The Bezier shape is rendered based on the new positions of the d+1 canonical locations, and the target location in its changed position lies on the rendered Bezier shape.

The predefined intended behavior may be expressed in response functions that define the relationship between changes in positions of target locations and changes in positions of canonical locations. The d+1 canonical locations define d sections in order along the shape from one end to the other end, and the predefined intended behavior includes the following: When the target location is in the first section, the one end is relocated, and the other end is constrained to its original location. When the target location is in the dth section, the other end is relocated and the one end is constrained to its original location.

When the Bezier shape is a surface, the position of the target location may be determined by forming a mesh on the surface and searching quadrilaterals of the mesh.

In general, in another aspect of the invention, a user drags a user interface element displayed in association with a Bezier shape to indicate an intended predefined distortion of the Bezier shape. In response to the dragging, the intended predefined distortion is effected by setting new positions for the control points.

Implementations of the invention may include one or more of the following features. The intended predefined distortion is effected by modifying a surface equation to effect the setting of new positions of the control points. The distortion may be symmetric or wave-like. The user interface element may be a handle that is constrained to move in a single direction during dragging.

Among the advantages of the invention are one or more of the following.

Surfaces and curves can be distorted in a more intuitive and controlled way than by manipulating individual control points. Control points may be automatically moved in response to a specified movement of an arbitrary point on a curve. The technique is well behaved no matter which point on the curve is dragged. While some points on the curve can move further than the dragged point, the effect is limited even in the worst case. Boundary conditions can be placed on the distortion of the curve, or surface, to satisfy external constraints or required behaviors. For example, moving a point near one end of the curve may have no effect on the opposite endpoint.

Other advantages and features will become apparent from the following description and from the claims.

DESCRIPTION

Figure 3:
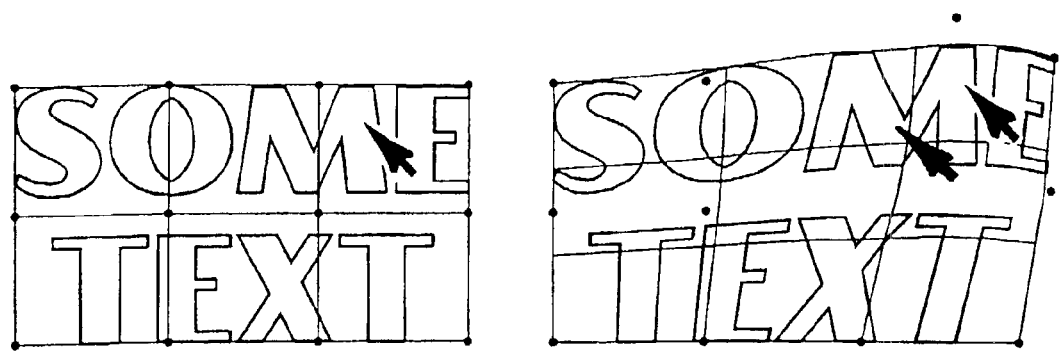
Figure 4:
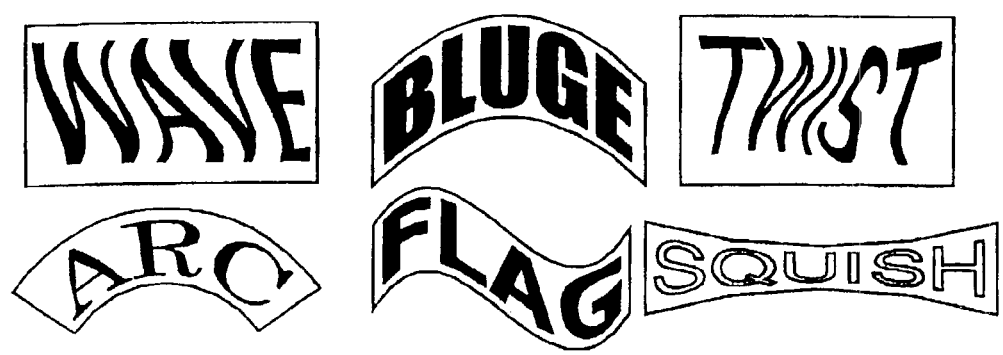
Figure 5:
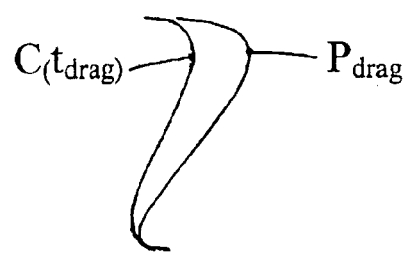
Figure 6:
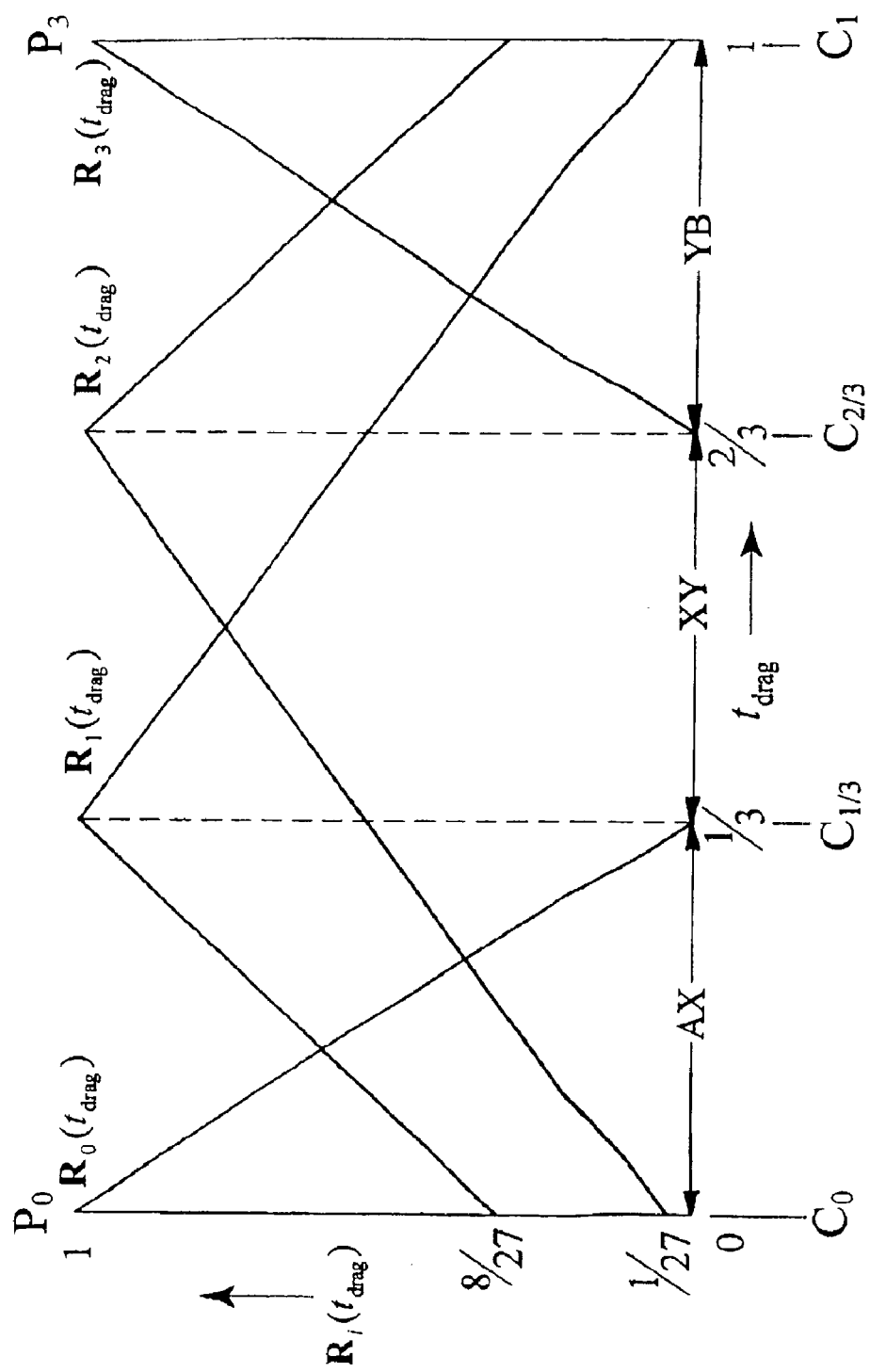
Figure 7:
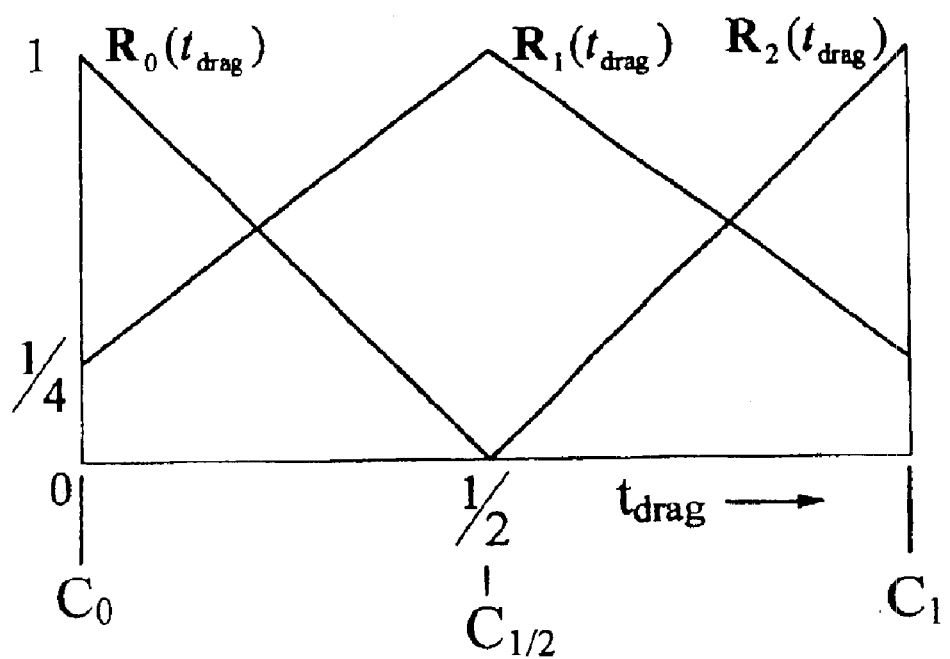
Figure 8:
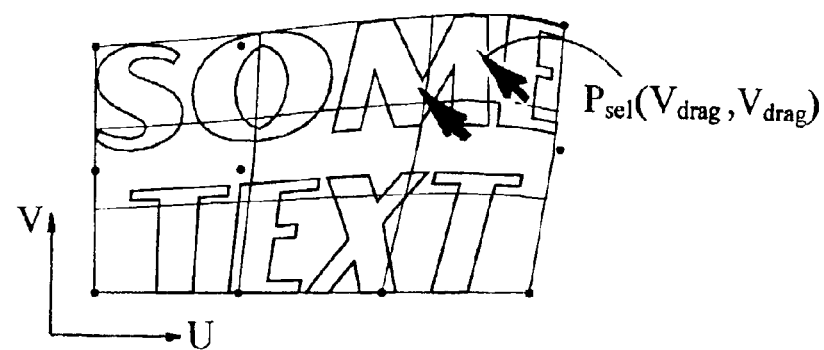
Figure 9:
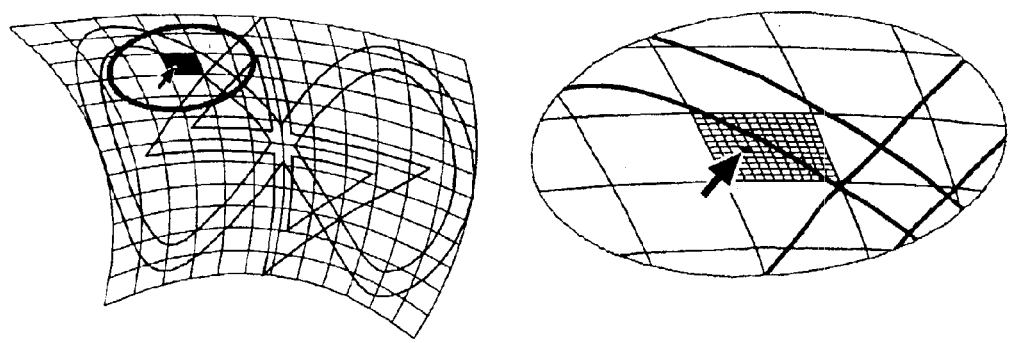
Figure 10:
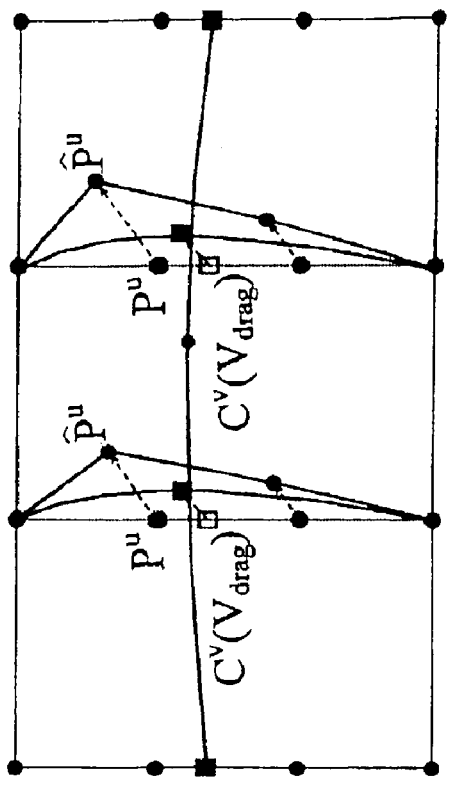
Figure 10:
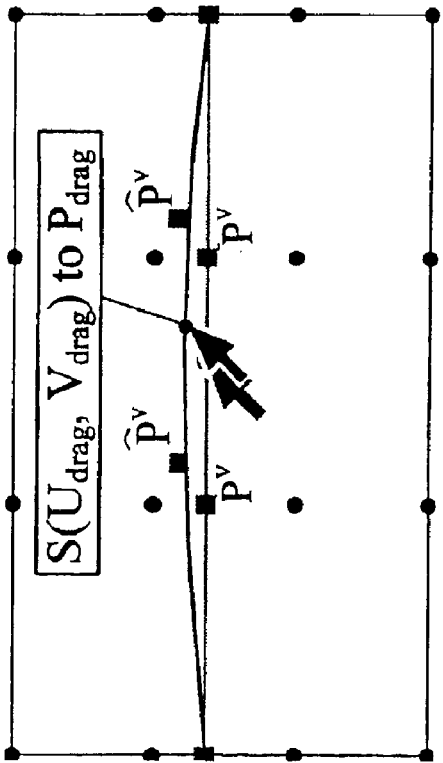
Figure 11:
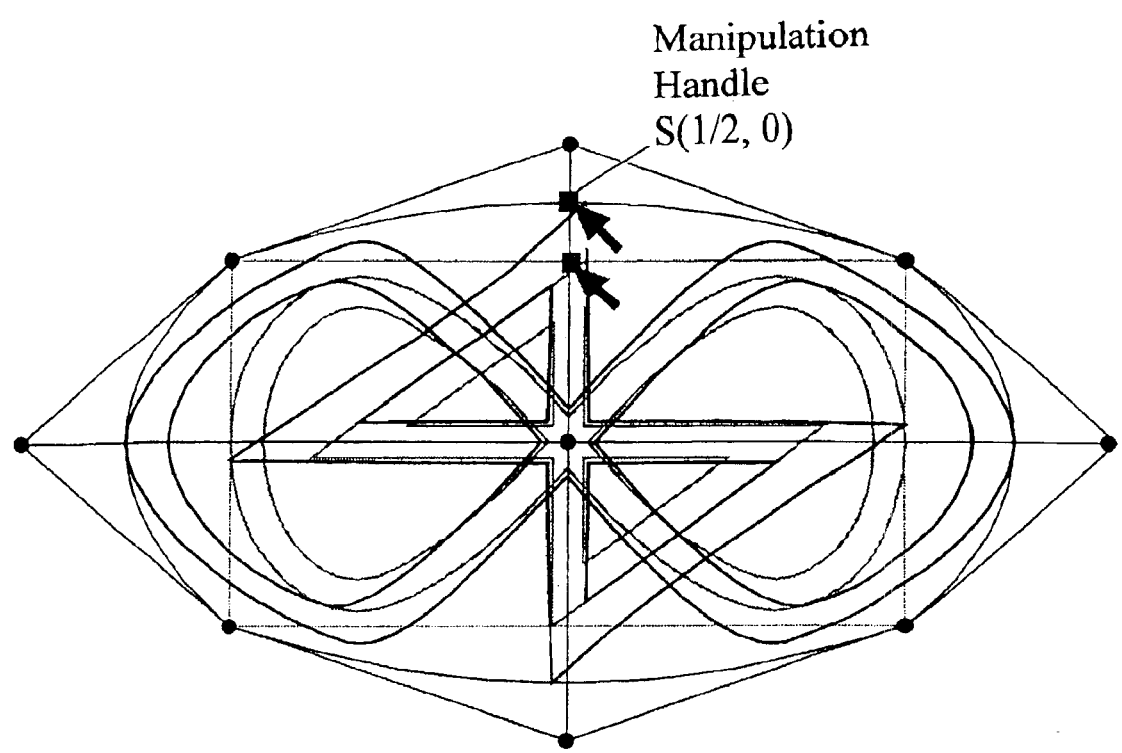
Figure 12:
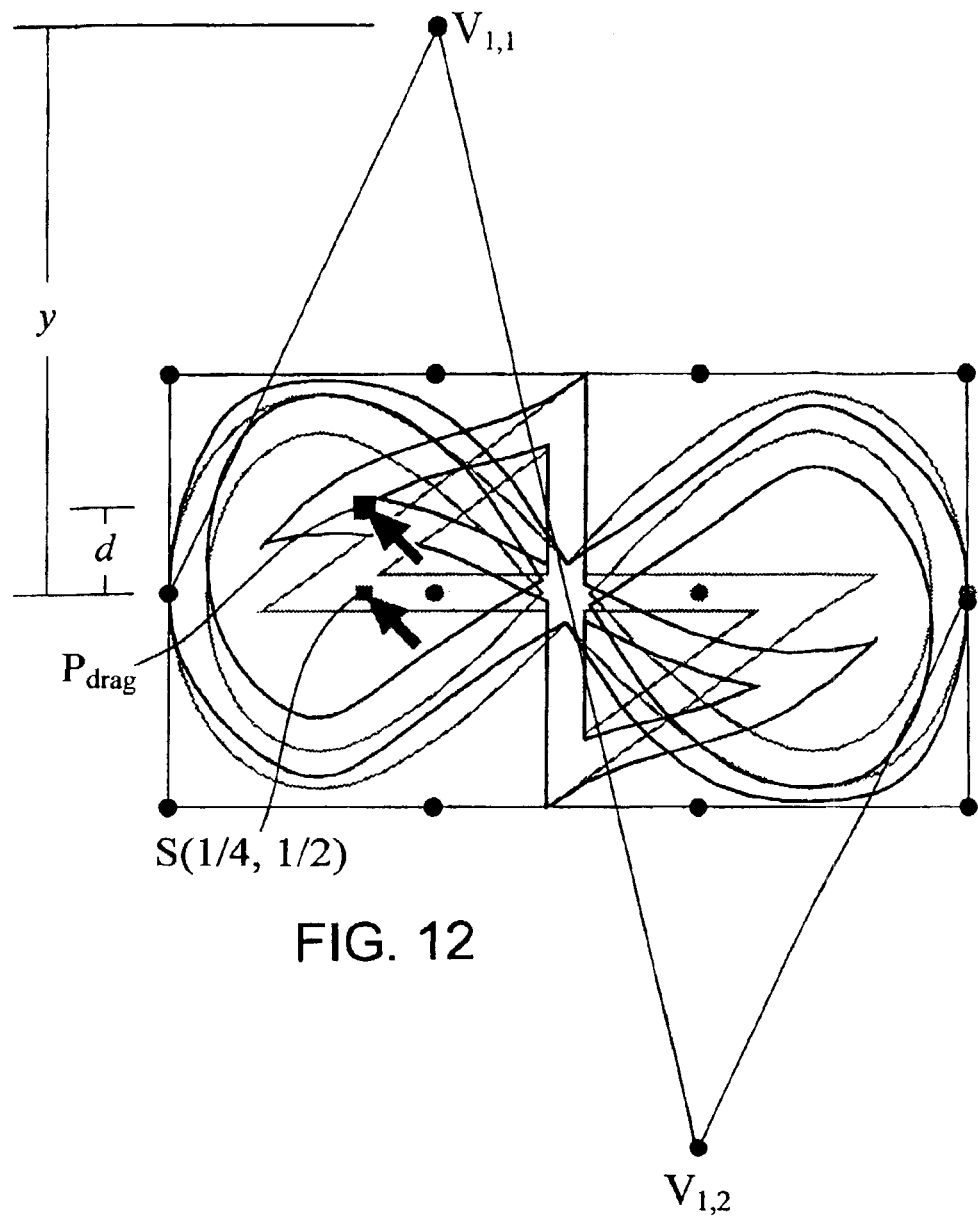
Figure 13:
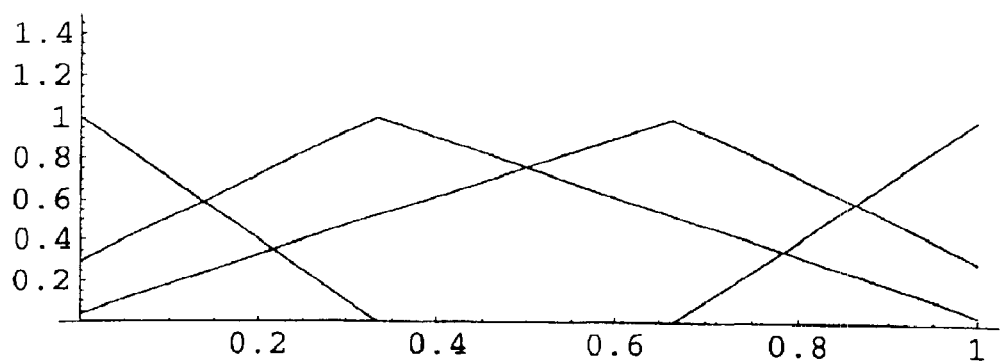
Figure 14:
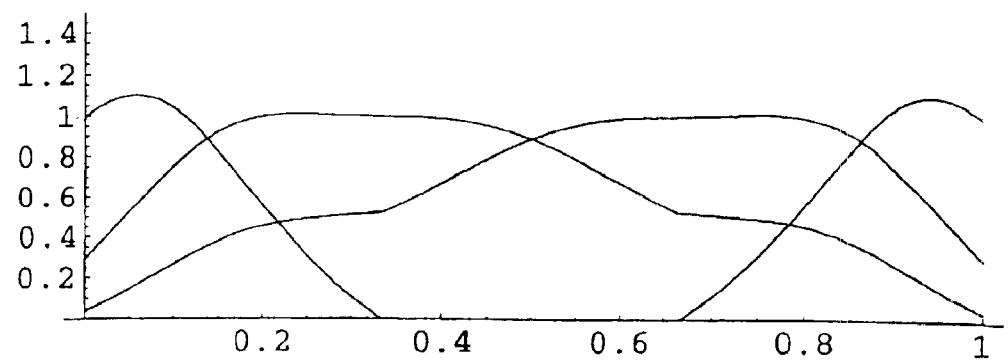
Figure 15:
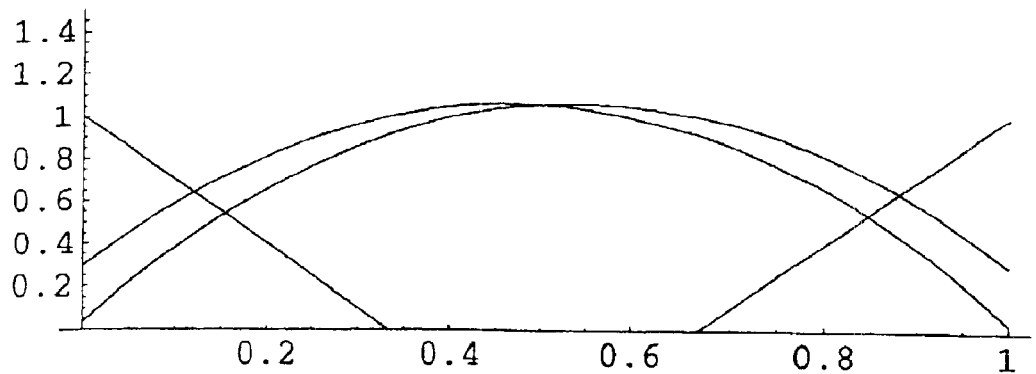
Figure 16:
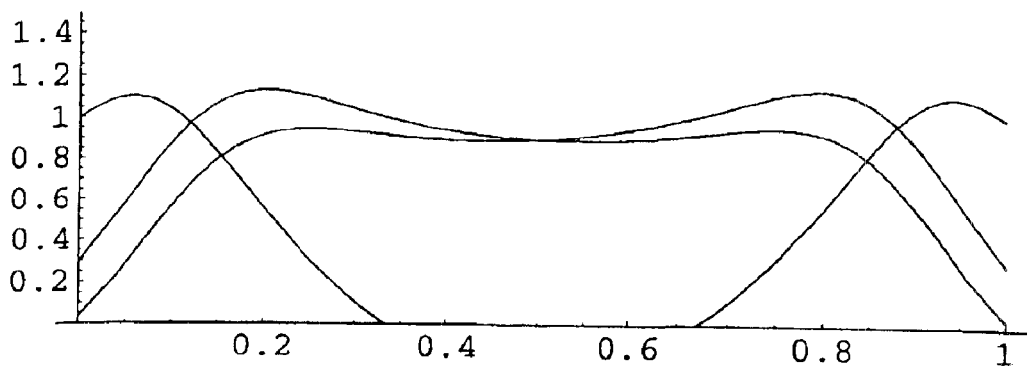
Figure 17:
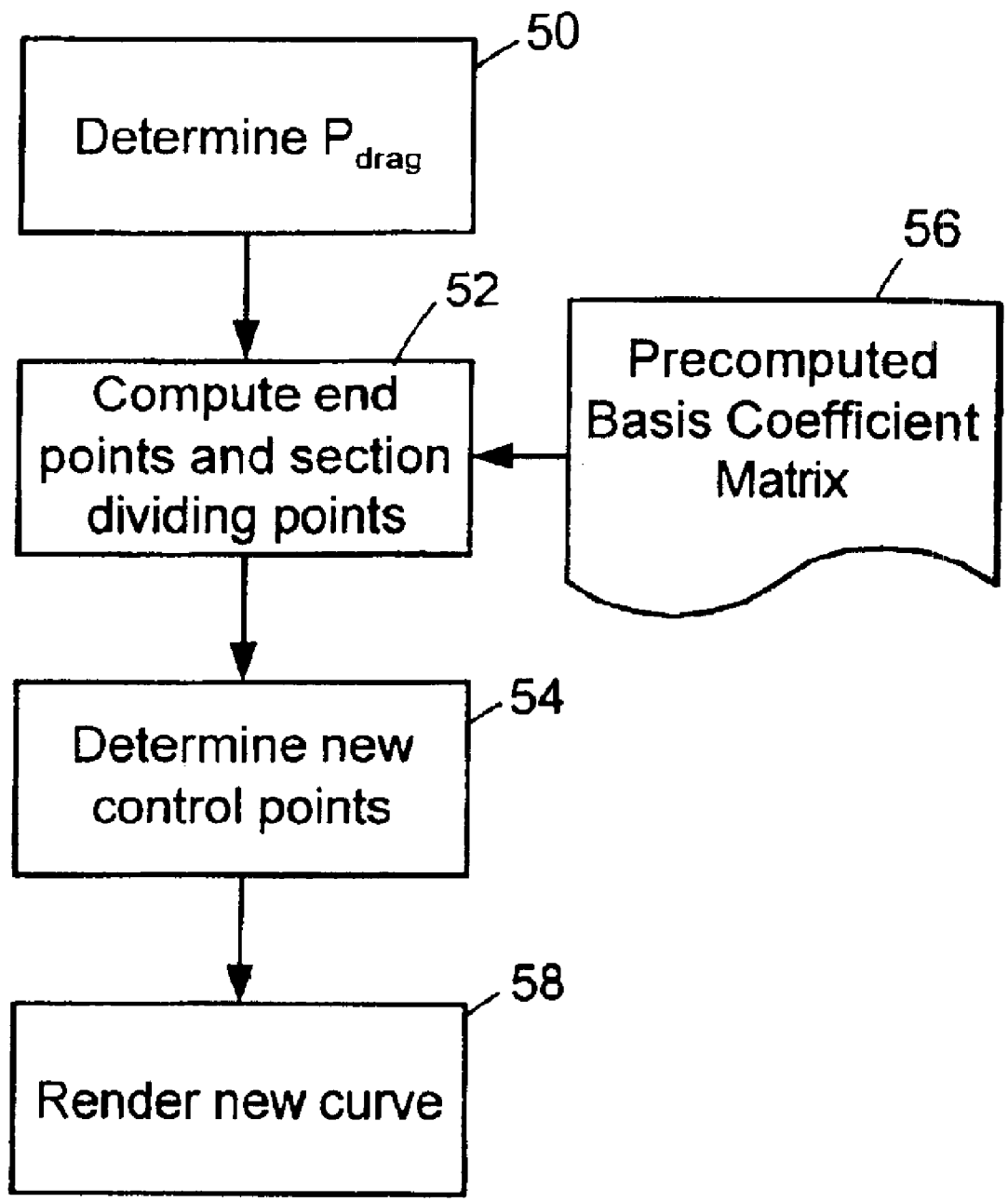

FIG. 1 shows distortion examples.
FIG. 2 shows distortion components.
FIG. 3 illustrates flexible sheet manipulation.
FIG. 4 illustrates predefined distortions.
FIG. 5 illustrates direct curve manipulation.
FIG. 6 shows response curves.
FIG. 7 shows quadratic response curves.
FIG. 8 illustrates surface dragging.
FIG. 9 illustrates sampling to determine surface parameters.
FIG. 10 illustrates the treatment of surface drag a series of curve drags.
FIG. 11 illustrates a direct manipulation of an "inflate" distortion.
FIG. 12 illustrates a wave distortion.
FIG. 13 shows linear response curves.
FIG. 14 shows scaled response curves.
FIG. 15 shows linear response curves.
FIG. 16 shows scaled response curves.
FIG. 17 shows a process for curve manipulation.

An improved natural user interface for manipulating the contours of curves enables a user simply to select and drag an arbitrary target point on the curve, leaving the software to determine how the rest of the curve should be distorted.

This approach for editing curves forms the basis of a "flexible sheet" style of free-form distortions for surfaces. As shown in FIG. 3, a distortion surface acts as a flexible sheet that can be pulled and shaped in an intuitive way by clicking and dragging the mouse at any target point on the surface. The software then takes care of manipulating the control points of the surface to provide the flexible sheet illusion.

As shown in FIG. 4, a different approach provides "canned" distortions that each move in pre-defined, symmetric way. Moving a single control handle takes care of moving all of the control points to create a pre-defined, symmetric distortion.

Curve Manipulation

Because manipulation of curves forms the basis for the "flexible sheet" method of distortion manipulation and because the notation for curves is simpler than for surfaces, we describe it first.

A Bézier curve is defined as $$C(t) = \sum_{i=0}^{d} P_i B_i^d(t)$$

Where $P_i$ are the control points, and $B_i^d(t)$ are the Bezier basis functions, defined as $$B_i^d(t) = \binom{d}{i} t^i (1-t)^{d-i}$$

d is the degree of the curve (e.g., for a cubic curve, d=3) and the curve has d+1 control points. In order to manipulate the curve, we wish to drag a particular point on the curve $C(t_{drag})$ to a point $P_{drag}$ such that the curve is adjusted in a "natural" way. Doing this requires first determining $t_{drag}$, which is the parameter of the curve that corresponds to the point on the curve to be moved to the new location. This determination is shown as step 50 in FIG. 17.

As shown in FIG. 5, one method for directly manipulating curves developed by Bartels and Beatty is based on the Householder equations. The control points $P_i$ are modified to create a new set of points according to:

$$\Delta = P_{drag} - C(t_{drag})$$

$$\hat{P}_i = P_i + \Delta \frac{B_i^d(t_{drag})}{\sum_{i=0}^{d} (B_i^d(t_{drag}))^2}$$

(The circumflex ^ is added to curves or points modified by a dragging operation.) While the Bartels and Beatty method produces a smooth change in the curve, it also produces artifacts. The length of the curve is often preserved, making it difficult to flatten a curved shape. The entire curve segment is adjusted, making local changes difficult. And either the end points are left fixed, producing a large change in the overall curve near the fixed point when a small change is made, or the endpoints are allowed to move, making it difficult to constrain changes.

Response Curves

Based on a consideration of how the curve should behave when a target point is dragged, the following criteria work well (in the case of a cubic curve) in defining how certain canonical points on the curve should move. An equivalent set can be written for, e.g., the quadratic case.

For $t_{drag} > 1/3$, C(0) does not move.

For $t_{drag} < 2/3$, C(1) does not move

Dragging at $t_{drag}=0$ behaves just like moving the $P_0$ control point.

Dragging at $t_{drag}=1$ behaves just like moving the $P_3$ control point.

Dragging at $t_{drag}=1/3$ or $t_{drag}=2/3$ maximally effects that point on the curve.

Given end points A and B (end points A and B are two of the canonical points, and also happen, in this case, to be control points) and intermediate division points X and Y, the three sections of the Bezier are denoted AX (section 1), XY (section 2) and YB (section 3). When dragging a target point located in section 1, end point B will not move, and A, X, and Y will each move based on the position of the target point between A and X. When dragging a target point located in section 2, end points A and B will not move, and X and Y will each move based on the position of the target point between X and Y. When dragging a target point within section 3, end point A will not move, and X, Y, and B will each move based on the position of the target point between Y and B.

FIG. 6 shows how these constraints translate into adjustments of the canonical points on the Bezier curve. Each of the four response curves $R_i(t_{drag})$ shows the extent of motion of one of the canonical points (denoted 0, 1, 2, 3) as a percentage of the dragged position change of any arbitrary drag point along the curve C, where the $t_{drag}$ value of the selected point on the curve is on the horizontal axis, and the vertical axis shows the amount by which the end points and the section dividing points C(i/3), i=0, 1, . . . , 3, on the curve (i.e., the canonical points) are affected by dragging the curve at point $C(t_{drag})$ to $P_{drag}$.

Consider the case of dragging the curve at the first end point, $t_{drag}=0$. Because (according to the third constraint above) this is the same as dragging $P_0$, the response curve $R_0$ for curve point C(0) has a value of 1 at that point, which means that the point at the first end of the curve (which is the same as the target point) moves as much as the target point is dragged. The response curve $R_1$ for curve point C(⅓) has a value of 8/27 at $t_{drag}=0$, because the Bezier basis function for the zeroth control point for a 3 degree curve is 8/27 evaluated at $t_{drag}=0$. Thus, when the section dividing point that is ⅓ of the way along the curve is moved by a unit, the first end point of the curve moves by 8/27 of a unit. In a similar way, the response curve $R_2$ for C(⅔) has a value (of the basis function) of 1/27 at the first end point of the curve, and the response curve $R_3$ for C(1) has a value (of the basis function) of zero at the first end point as required by the constraint above that, for t<⅔, C(1) does not move.

Applying the Method

When a target point $C(t_{drag})$ is dragged to $P_{drag}$, the first step is to compute the new positions of the end points and the section dividing points of the new curve Ĉ (step 52, FIG. 17) by applying the response curve to the original curve a $$\hat{C}(i/3) = \Delta R_i(t_{drag}) + C(i/3), i=0, \ldots, 3$$

Then, the new control points for the curve are determined (step 54) by writing the calculation of the Bézier curve points C(i/3), i=0, . . . , 3 in matrix form:

$$C^T = BP$$

where B is the basis coefficient matrix:

$$B = \begin{bmatrix} B_0^3(0) & B_1^3(0) & B_2^3(0) & B_3^3(0) \\ B_0^3(1/3) & B_1^3(1/3) & B_2^3(1/3) & B_3^3(1/3) \\ B_0^3(2/3) & B_1^3(2/3) & B_2^3(2/3) & B_3^3(2/3) \\ B_0^3(1) & B_1^3(1) & B_2^3(1) & B_3^3(1) \end{bmatrix}$$

To find the new control points, $\hat{C}$ (i/t) is substituted for C(i/t) in the equation above, which is then solved for the new control points:

$$\hat{P} = \hat{C}B^{-1}$$

Because the basis coefficient matrix is constant, it can be pre-computed (step 56). The new curve rendered from the control points (step 58) will move towards $P_{drag}$ but may not actually reach it. In an interactive program, this is often not noticeable, because the constraint will be satisfied on the next iterations of the mouse tracking loop. However, it is possible to avoid this behavior in a manner described later.

Extensions to Non-Cubic Curves

The curve dragging method is extended to non-cubic curves by creating new response curves $R_i$ for points on the curve at C(i/d), i=0, . . . , d. Response curves for a quadratic curve, for example, are shown in FIG. 7. When the curve dragged is part of a multiple-segment Bézier curve, the curve continuity should be maintained by keeping the control points on the adjoining segments co-linear with the ones on the dragged segment, and at the same distance.

Manipulating a Distortion Surface

Extending the methods described above to surfaces provides an intuitive, natural way to edit the distortion surfaces described previously.

A distortion surface of the kind shown in FIG. 8 is described as:

$$S(u, v) = \sum_{i=0}^{n} \sum_{j=0}^{m} V_{i,j} B_j^m(u) B_i^n(v)$$

where u, v are the parameters of the surface, $V_{ij}$, is the (n+1)×(m+1) mesh of control points, and $$B_j^m(u), B_j^n(v)$$

are the Bézier basis functions of degree m, n as described above. The goal of the free-form manipulation is to drag an arbitrary point on the surface $S(u_{drag}, v_{drag})$ to $P_{drag}$ in a similar fashion to the curve manipulation method described above.

To drag a point on the surface, the parameters $u_{drag}, v_{drag}$, of the selected point on the surface must be determined, given the selected target point $P_{set}$, so that $S(u_{drag}, v_{drag})$ is approximately equal to $P_{set}$. As shown in FIG. 9, to accomplish this, the deformation surface is first coarsely sampled in uniform steps in u and v. A typical sampling rate of 4(n+1)×4(m+1) is used across the entire surface. By connecting points adjacent to each other in parameter space, the resulting sample points form a mesh of quadrilaterals covering the surface. Each quadrilateral is checked to see if it contains $P_{set}$ by checking $P_{set}$ against the line equations of the four borders of the quadrilateral (the lines are formed by proceeding around the quadrilateral in a consistent direction, e.g., clockwise). If $P_{set}$ is on the same side of all four lines, then it lies inside. If $P_{set}$ is found to lie inside one of the quadrilaterals, then the process is repeated, except this time the sampling is done over the parameter range for just that quadrilateral rather than the entire surface. The indices of the sample points containing $P_{set}$ are used to determine the parameters $u_{drag}, v_{drag}$. While this process can be repeated indefinitely to improve accuracy, in practice two iterations are sufficient for interactive manipulation.

Extending Curve Manipulation to Surface

Applying the drag method to the surface proceeds in two steps. First the drag is applied to the iso-curve at $v_{drag}$. Then, each of the control points of this iso-curve is used as a $P_{drag}$ for modifying the curves formed by the columns of control points in the surface as shown in FIG. 10. Because the surface drag is developed as a series of curve drags, it is useful to express the curve manipulation method described in the previous section for dragging the point $C(t_{drag})$ to $P_{drag}$ as a function that generates a new set of curve control points from the original control points P:

$$\hat{P} = \text{Drag}(P, t_{drag}, \Delta)$$

where $$\Delta = P_{drag} - C(t_{drag})$$

The iso-curve at $V_{drag}$ $C^v$ is formed by control points $P^v$ computed via:

$$P_j^v = \sum_{i=0}^{n} V_{i,j} B_i^n(v_{drag}), j = 0 \ldots m$$

A new set of control points for this iso-curve is computed with:

$$\hat{P}^v = \text{Drag}(P^v, u_{drag}, P_{drag} - S(u_{drag}, v_{drag}))$$

The control points for this new curve are used to drag the columns of the control points by applying them to the surface control points:

for j=0 . . . m
 $P_i^H = V_{i,j}$, i=0 . . . n
 $\hat{P}^H = \text{Drag}(P^u, v_{drag}, \hat{P}_j^v - P_j^v)$
 $V_{i,j} = \hat{P}_i^u$, i=0 . . . n Manipulating Pre-defined Distortions We now consider a different approach to surface distortion. The methods described above are useful for free-form manipulation of the distortion surface to produce an arbitrary shape. However, there are many cases where it is useful to produce distortions with a symmetric shape, where the manipulation is confined to a single parameter. Consider an "inflate" pre-defined distortion as shown in FIG. 11. In this case, as the parameter is changed, the edges of the distortion move in or out. The "inflate" distortion is a bi-quadratic. The amount of distortion is controlled by a single parameter, which moves the control points on the center of each edge towards (or away from) the center of the mesh. While this manipulation can be done with a traditional user interface tool such as a slider control, another better approach is to provide a handle on the surface that the user drags to the desired shape, subject to the constraints of the symmetry. This closely matches the free-form dragging behavior described above, and makes the surface editing more precise, easier to learn, and easier to use.

To provide this control, a method is needed to convert the movement of the mouse (in one dimension) into a corresponding movement amount for the symmetric movement of the control points in the distortion. This generally involves modifying the surface equation (see above) to incorporate the desired symmetric movement, and then solving that equation for the amount to move the control points.

Continuing with the inflate deform example, a handle is placed at S(½,0). This handle is constrained to move only vertically and should track the top of the deformation. To simplify the problem, consider just the top iso-curve of the surface (v=0, $V_{0,0\ldots 2}$). As the handle is dragged, the control point $V_{0,1}$ should move so that the point on the curve S(½,0) tracks the mouse as it moves. To find out how far $V_{0,1}$ should move so that the handle tracks the curve, consider the formulation of the curve (with u=½, and ignoring v for the moment):

$$S(1/2, 0) = \frac{1}{4}V_{0,0} + \frac{1}{2}V_{0,1} + \frac{1}{4}V_{0,2}$$

With $V_{0,0}$ and $V_{0,2}$ fixed, we can see that $V_{0,1}$ moves twice as far as the point on the curve S(½,0). Thus, when the handle at S(½,0) is dragged, the four control points on the edges are moved twice the distance the handle was moved, giving the illusion that the handle is fixed onto the edge of the distortion.

As a second, more complex example, consider the "wave" distortion shown in FIG. 12. When the single parameter of this distortion is changed, the left interior control point moves up, and the right interior control point moves down in equal amounts. If y is the wave amount, then the distortion is determined by:

$V_{1,1}$=c+y $V_{1,2}$=c−y where c is the vertical coordinate of the center of the distortion's bounding box. ($V_{i,j}$, refers to just they coordinate $V_{i,j}$; because the x coordinates are not affected they may be ignored). To give maximum control, the handle should start out at S(¼,½). As this handle is dragged up or down, we want it to track the surface, with $V_{1,1}$ moving in the same direction as the handle and $V_{1,2}$ moving in the opposite direction. To do this, we need to find the value corresponding to the difference between the original handle location at S(¼,½) and $P_{drag}$. If we call this difference d, and the corresponding distance the control points $V_{1,1}$ and $V_{1,2}$ each move y, we find d is related toy via the equation:

$$d = P_{drag} - S_y(u, v)$$

$$d = B_0^2(v)\sum_{j=0}^{3} V_{0,j}B_j^3(u) +$$

$$B_1^2(v)(V_{1,0}B_0^3(u) + yB_1^3(u) - yB_2^3(u) + V_{1,3}B_3^3(u)) +$$

$$B_2^2(v)\sum_{j=0}^{3} V_{2,j}B_j^3(u)$$

Solving for y gives:

$$y = \frac{d - B_0^2(v)\sum_{j=0}^{3} V_{0,j}B_j^3(u) - B_2^2(v)\sum_{j=0}^{3} V_{2,j}B_j^3(u) - V_{1,0}B_0^3(u)B_1^2(v) + V_{1,3}B_3^3(u)B_1^2(v)}{B_1^2(v)(B_1^3(u) - B_2^3(u))}$$

Collecting terms and substituting u=¼, v=½ gives:

$$y = \frac{256d - 27(V_{0,0} + 2V_{1,0} + V_{2,0}) - 27(V_{0,1} + V_{2,1}) - 9(V_{0,2} + V_{2,2}) - (V_{0,3} + 2V_{1,3} + V_{2,3})}{36}$$

This is the equation relating the mouse movement d to the control point movement y.
Other Deformations Other direct controls for pre-defined deformations can follow the same general strategy of relating the mouse movement to a point on the surface. Deformations could also have multiple handles (e.g., one for a vertical stretch and another for horizontal) with the implementation strategy being applied to each handle.
Moving a Target Point in a Single Step As mentioned, the method described above for free-form manipulation of the distortion of the surface using a point on the surface does not adjust a curve sufficiently in a single iteration to move a target point by an amount indicated by dragging. However, the method can be enhanced to move the point by the required amount in a single step. Below we discuss how this is done for the cubic case. The same approach can be applied to, e.g., the quadratic case.

In the basic method the desired displacements of four canonical points on the curve, at t=0, ⅓, ⅔, and 1, are specified by the response curves for four specific choices of the dragged point, $t_{drag}$=0, ⅓, ⅔, and 1. The behavior of the four on-curve canonical points for other values of $t_{drag}$ was derived by linear interpolation as shown by the linear segments of the response curves. Although linear functions are easy to compute, the result of the choice of linear interpolation is that the dragged point may not be displaced by the correct amount.

Among the possible methods for interpolating behavior for intermediate values of $t_{drag}$, a set of scaled response curves, $S_i$ derived in a manner explained below, works well. Starting with the response curves, $R_i$, of the basic method, we find the resulting displacement of the Bezier control points, and of the point, $t_{drag}$. The point, $t_{drag}$, will have moved a fraction, f, of the required distance. We therefore scale the displacements of the Bezier control points by the factor 1/f. The linear nature of the whole system ensures that this will result in the point, $t_{drag}$, being displaced by the correct amount.

By making different choices of the response curves we can generate different corrected response curves. These different choices will affect the relative amounts by which the various control points move.

The correction may be implemented by literally coding the correction steps as described. Alternatively, the appropriate correction can be derived algebraically, as explained below.

We use the following scaled response curves notation (there has been some reuse of variable names that were previously used for other purposes in the earlier discussion):

C(t)—Position of point on Bezier curve at t
ΔC(t)—Change in position of point on Bezier curve at 1
ΔCV=[ΔC(0) ΔC(⅓) ΔC(⅔) ΔC(1)]—Vector of curve points at t=0.1/3.2/3.1
$P_i$, i=0.3—Position of Bezier control point i
$\Delta P_i$, i=0.3—Change in position of Bezier control point i
P=($P_0$ $P_1$ $P_2$ $P_3$)—Row vector of $P_i$
ΔP=(Δ$P_0$Δ$P_1$Δ$P_2$Δ$P_3$)—Row vector of Δ$P_1$
$R_i(t_{drag})$,1=0.3—Value of Response Curve at $t_{drag}$ $R(t_{drag}) = (R_0(t_{drag})\ R_1(t_{drag})\ R_2(t_{drag})\ R_3(t_{drag}))$—Row vector of $R(t_{drag})$ $S_i(t_{drag})$, i=0..3—Value of Scaled Response Curve at $t_{drag}$ $S(t_{drag}) = (S_0(t_{drag})\ S_1(t_{drag})\ S_2(t_{drag})\ S_3(t_{drag}))$–Row vector of $S_i(t_{drag})$ M—Bezier coefficient matrix $T(t) = (1\ t\ t^2\ t^3)$—Row vector of powers of t $T(t)^T$—Transpose of T(t)

A—Power matrix

ΔL—Vector through which pointing Locator is dragged $B^n$—Vector of Bezier basis functions of degree n The position of a point, C(t), on a Bezier curve is given by $$C(t) = P.M.T(t)^T \quad (EQ\ 1)$$

where $$M = \begin{bmatrix} 1 & -3 & 3 & -1 \\ 0 & 3 & -6 & 3 \\ 0 & 0 & 3 & -3 \\ 0 & 0 & 0 & 1 \end{bmatrix}$$

The change, ΔC(t), in position of a point for a given change, ΔP, in the positions of the control points is $$\Delta C(t) = \Delta P.M.T(t)^T \quad (EQ\ 2)$$

Applying this to the four canonical points, t=0, ⅓, ⅔, 1

$$[\Delta C(0) \Delta C(\tfrac{1}{3}) \Delta C(\tfrac{2}{3}) \Delta C(t)] = \Delta CV = \Delta P.M.A \quad (EQ\ 3)$$

where $$A = \begin{bmatrix} 1 & 1 & 1 & 1 \\ 0 & \tfrac{1}{3} & \tfrac{2}{3} & 1 \\ 0 & \tfrac{1}{9} & \tfrac{4}{9} & 1 \\ 0 & \tfrac{1}{27} & \tfrac{8}{27} & 1 \end{bmatrix} \quad (EQ\ 4)$$

is obtained by substituting the values t=0, ⅓, ⅔, 1 into the column $T(t)x^T$, expressed as a matrix.

From equation 3, the change in position of the control points required to achieve a change in position of the four canonical points on the curve is $$\Delta P = \Delta CV.A^{-1}.M^{-1} \quad (EQ\ 5)$$

where $$A^{-1} = \begin{bmatrix} 1 & -\tfrac{11}{2} & 9 & -\tfrac{9}{2} \\ 0 & 9 & -\tfrac{45}{2} & \tfrac{27}{2} \\ 0 & -\tfrac{9}{2} & 18 & -\tfrac{27}{2} \\ 0 & 1 & -\tfrac{9}{2} & \tfrac{9}{2} \end{bmatrix} \text{ and } M^{-1} = \begin{bmatrix} 1 & 1 & 1 & 1 \\ 0 & \tfrac{1}{3} & \tfrac{2}{3} & 1 \\ 0 & 0 & \tfrac{1}{3} & 1 \\ 0 & 0 & 0 & 1 \end{bmatrix}$$

The changes in position of the canonical curve points, ΔCV, is determined from the response curves $$\Delta CV = \Delta L.R.(tdrag) \quad (EQ\ 6)$$

Substituting into equation 5

$$\Delta P = \Delta L.R(t_{drag}).A^{-1}.M^{-1} \quad (EQ\ 7)$$

This is essentially the formulation used in the basic method. Now we examine how a point, t, on the curve is affected.

Combining equation 2 and equation 7

$$\Delta C(t) = \Delta L.R(t_{drag}).A^{-1}.T(t)^T \quad (EQ\ 8)$$

This shows that the displacement, ΔC(t), of the point t on the curve is a scale factor, $R(t_{drag}).A^{-1}T(t)^T$, times the movement, ΔL, of the locator. In particular $$\Delta C(t_{drag}) = L.R(t_{drag}).A^{-1}.T(t_{drag})^T \quad (EQ\ 9)$$

To ensure that the $C(t_{drag})$ stays with the locator we require $\Delta C(t_{drag}) = \Delta L$. We therefore need to modify the scale factor by $1(R(t_{drag}).A^{-1}.T(t_{drag})^T)$. This can be achieved by scaling the response curves to give the scaled response curves, S(t), where $$S(t_{drag}) = R(t_{drag})/R(t_{drag}).A^{-1}.T(t_{drag})^T) \quad (EQ\ 10)$$

The revised expression for computing changes, ΔP, in the positions of the Bezier control points for a given displacement, ΔL, of the locator at point $t_{drag}$ on the curve is, from equation 7:

$$\Delta P = \Delta L.S(t_{drag}).A^{-1}.M^{-1} \quad (EQ\ 11)$$

The choice of $R(t_{drag})$ used in the basic method is shown in FIG. 13. The corresponding scaled response curves are shown in FIG. 14.

Alternative Response Curves

While the curves of FIG. 13 work well in an interactive environment, the discontinuity of slope in $S_1(t_{drag})$ at $t_{drag} = \tfrac{1}{3}$, and similarly in $S_2(t_{drag})$, may be considered undesirable. This can be fixed by making a different choice of $R_1(t_{drag})$ and $R_2(t_{drag})$. For example, FIG. 15 shows, for the case of a two-degree curve) response curves in which $R_1(t_{drag})$ and $R_2(t_{drag})$ are $2^{nd}$ degree polynomials interpolating the same boundary conditions:

$$R_1(t_{drag}) = 8/27 + t*89/27 + t^2*32/9$$

$$R_2(t_{drag}) = R_1(t - t_{drag})$$

The corresponding scaled response curves are shown in FIG. 16.

Application to Curves of Other Degree

The treatment given here may be applied directly to Bezier curves of degree other than three. Differences include the size of the various vectors and matrices, the coefficients in the Bezier coefficient matrix, M, and the boundary conditions for the response curves. For degree 2 curves (quadratic), the boundary conditions require that for t drag<½, the end of the curve, C(1), does not move, and similarly for t drag>½ with respect to end C(0). See FIG. 7.

The linear case is the same as a linear (degree one) example proposed by Bartels and Beatty.

End Conditions

When the end, t drag=0, of a curve is moved, the treatment given here causes the curve to distort as if only the control point, $P_0$, were moved—all other control points remain fixed. This is not always desirable. For example, the curve may be part of a composite curve, consisting of many Bezier segments connected end-to-end, with slope continuity between segments. In this case, moving the end of a curve segment should move not only the control point, $P_0$, but also the adjacent control point $P_1$. This will have the effect of maintaining the slope of the end of the curve. If the same treatment is given to the adjoining curve segment, whose end is also being dragged at the same time, then continuity of slope is maintained. This behavior can be incorporated into the present scheme by modifying the boundary conditions on the response curves, as follows:

$$R_1(0)=R_2(1)=B_0^3(\frac{1}{3})=20/27$$

$$R_1(1)=R_2(0)=B_0^3(\frac{2}{3})=B_1^3(\frac{2}{3})=7/27.$$

This gives rise to the following response curves:

$$R_0(t_{drag})=\text{if } (t_{drag}<\frac{1}{3}) \text{ then } (1-3*t_{drag}) \text{ else } (0)$$

$$R_1(t_{drag})=\text{if } (t_{drag}<\frac{1}{3}) \text{ then } (20/27+t_{drag}*21/27) \text{ else } (37/27-t_{drag}*30/27)$$

$$R_2(t_{drag})=R_1(1-t_{drag})$$

$$R_3(t_{drag})=R_0(1-t_{drag})$$

Corresponding scaled response curves can be derived from these expressions using equation 10. In any given implementation, both forms of boundary conditions might be used. The original form may be appropriate for ends of composite curves, or for moving interior segment ends where slope continuity is not required. This new set of response curves is more appropriate for interior segment ends where slope continuity is required. The remaining question concerns maintenance of slope continuity between joined Bezier segments when t drag>0, because the adjacent segment will not normally be affected. Two strategies present themselves. Both involve repositioning the adjacent slope control point of the adjacent segment so that it is co-linear with the end point and slope point of the current segment. One strategy would maintain the length of the adjacent slope vector. The other would maintain the ratio of the magnitudes of the slope vectors at the adjoining ends.

Other embodiments are within the scope of the following claims.

What is claimed is:

1. A method comprising
receiving a user-specified change in position of any arbitrary target location on a Bezier shape, the Bezier shape being governed by control points, and
in response to the user-specified change in position, determining new positions for canonical locations of the Bezier shape based on predefined behaviors of the canonical locations with respect to the user-specified change in position, the positions of the canonical locations along or across the Bezier shape being predefined to divide the Bezier shape into sections of predetermined proportions such that a particular one of the canonical locations at least sometimes has two different predefined behaviors, with respect to the user-specified change in position, when the user-specified arbitrary target location is, respectively, in different sections of the shape, and
determining the control points for a new Bezier shape based on the new positions of the canonical locations.

2. The method of claim 1 in which the Bezier shape comprises a curve or a surface.

3. The method of claim 1 wherein the new Bezier shape that is governed by the determined control points has a path or surface that is determined by the path or surface of the Bezier shape that existed prior to receiving the user-specified change in position, and by the user-specified change in position.

4. A medium storing machine readable instructions arranged to cause a machine to
receive a user-specified change in position of any arbitrary target location on a Bezier shape, the Bezier shape being governed by control points, and
in response to the user-specified change in position, determine new positions for canonical locations of the shape based on predefined behaviors of the canonical locations with respect to the user-specified change in position, the positions of the canonical locations along or across the Bezier shape being predefined to divide the Bezier shape into sections of predetermined proportions such that a particular one of the canonical locations at least sometimes has two different predefined behaviors, with respect to the user-specified change in position, when the user-specified arbitrary target location is, respectively, in different sections of the shape, and
determining the control points of a new Bezier shape based on the new positions of the canonical locations.

5. A method comprising
receiving a user-specified change in position of any arbitrary target location on a Bezier shape, the Bezier shape being governed by control points,
in response to the user-specified change in position, determining new positions for canonical locations of the shape based on predefined behaviors of the canonical locations, the positions of the canonical locations along or across the Bezier shape being predefined to divide the Bezier shape into sections of predetermined proportions such that a particular one of the canonical locations at least sometimes has two different predefined behaviors, with respect to the user-specified change in position, when the user-specified arbitrary target location is, respectively, in different sections of the shape, the predefined intended behaviors being expressed in scaled response functions that define the relationship between changes in positions of target locations and changes in positions of canonical locations,
adjusting the control points so that a new Bezier shape contains the canonical locations in their new positions, and
rendering the new Bezier shape based on the new positions of the canonical locations so that the target location in its changed position lies on the rendered Bezier shape.

6. A method comprising
receiving a user-specified change in position of a target location on a Bezier curve or surface, the target location not being on a boundary of the curve or surface, the Bezier curve or surface being governed by control points, and
in response to the user-specified change in position, determining new positions for canonical locations of the curve or surface based on predefined behaviors of the canonical locations with respect to the user-specified change in position, the positions of the canonical locations along or across the Bezier shape being predefined to divide the Bezier shape into sections of predetermined proportions such that a particular one of the canonical locations at least sometimes has two different predefined behaviors, with respect to the user-specified change in position, when the user-specified arbitrary target location is, respectively, in different sections of the shape, and determining the control points for a new Bezier shape based on the new positions of the canonical locations.

7. A method comprising enabling a user to drag a target location on a Bezier curve or surface to indicate a new position for the target location, the target location not being on a boundary of the Bezier surface, the Bezier curve or surface being governed by control points, and in response to the dragging, determining new positions for canonical locations of the curve or surface based on predefined behaviors of the canonical locations with respect to the user-specified change in position, the positions of the canonical locations along or across the Bezier shape being predefined to divide the Bezier shape into sections of predetermined proportions such that a particular one of the canonical locations at least sometimes has two different predefined behaviors, with respect to the user-specified change in position, when the user-specified arbitrary target location is, respectively, in different sections of the shape, and determining the control points for a new Bezier shape based on the new positions of the canonical locations.

8. The method of claim 1, 6, or 7 in which the shape comprises a d-degree Bezier curve, d an integer greater than 1, governed by d+1 control points.

9. The method of claim 8 in which there are d+1 canonical locations.

10. The method of claim 1, 6, or 7 further comprising adjusting the control points so that the Bezier shape contains the canonical locations in their new positions.

11. The method of claim 1, 6, or 7 further comprising rendering the Bezier shape based on the new positions of the d+1 canonical locations.

12. The method of claim 11 in which the target location in its changed position lies on the rendered Bezier shape.

13. The method of claim 1, 6, or 7 in which the predefined behaviors are expressed in response functions that define the relationship between changes in positions of target locations and changes in positions of canonical locations.

14. The method of claim 9 in which the Bezier shape comprises a curve, the d+1 canonical locations define d sections in order along the shape from one end to the other end, and the predefined intended behavior comprises the following:

when the target location is in the first section, the one end is relocated, and the other end is constrained to its original location, and when the target location is in the first section, the other end is relocated and the one end is constrained to its original location.

15. The method of claim 1, 6, or 7 in which the Bezier shape comprises a d-degree curve, the one end and the other end comprise end points of the curve, and the target location comprises a point along the curve.

16. The method of claim 1, 6, or 7 in which the Bezier shape comprises a 3-degree curve and there are four canonical locations.

17. The method of claim 1, 6, or 7 in which the Bezier shape comprises a 2-degree curve and there are three canonical locations.

18. The method of claim 1, 6, or 7 in which the control points are adjusted using a pre-computed basis coefficient matrix.

19. The method of claim 1, 6, or 7 in which the Bezier shape comprises a surface and in which the position of the target location is determined by forming a mesh on the surface and searching quadrilaterals of the mesh.

20. The method of claim 16 further comprising processing the relocation information as a series of curve relocations.

21. The method of claim 4 wherein the new Bezier shape that is governed by the determined control points has a path or surface that is determined by the path or surface of the Bezier shape that existed prior to receiving the user-specified change in position, and by the user-specified change in position.

22. The method of claim 5 wherein the new Bezier shape that is governed by the determined control points has a path or surface that is determined by the path or surface of the Bezier shape that existed prior to receiving the user-specified change in position, and by the user-specified change in position.

23. The method of claim 6 wherein the new Bezier shape that is governed by the determined control points has a path or surface that is determined by the path or surface of the Bezier shape that existed prior to receiving the user-specified change in position, and by the user-specified change in position.

24. The method of claim 7 wherein the new Bezier shape that is governed by the determined control points has a path or surface that is determined by the path or surface of the Bezier shape that existed prior to receiving the user-specified change in position, and by the user-specified change in position.

* * * * *

UNITED STATES PATENT AND TRADEMARK OFFICE
CERTIFICATE OF CORRECTION

PATENT NO. : 6,911,980 B1
DATED : June 28, 2005
INVENTOR(S) : Martin E. Newell et al.

It is certified that error appears in the above-identified patent and that said Letters Patent is hereby corrected as shown below:

Column 13,
Line 39, delete "arc" and replace with -- are --;

Column 14,
Line 1, delete "first" and replace with -- dth --.

Signed and Sealed this

Sixth Day of September, 2005

JON W. DUDAS
*Director of the United States Patent and Trademark Office*